United States Patent [19]

Greene

[11] Patent Number: 4,665,772
[45] Date of Patent: May 19, 1987

[54] SHIFT CONTROL SYSTEM FOR IMPLEMENT TRANSMISSION

[75] Inventor: Walter D. Greene, Racine, Wis.
[73] Assignee: J. I. Case Company, Racine, Wis.
[21] Appl. No.: 762,499
[22] Filed: Aug. 5, 1985
[51] Int. Cl.$^4$ .................................. B60K 41/22
[52] U.S. Cl. .................. 74/862; 74/336 R; 74/866; 192/3.62
[58] Field of Search ............ 74/866, 334, 335, 336 R, 74/862; 192/82 T, 3.58, 3.61, 3.62, 0.052; 73/517 AV

[56] References Cited

U.S. PATENT DOCUMENTS

| | | | |
|---|---|---|---|
| 3,808,738 | 5/1974 | Siebers et al. | 74/866 X |
| 3,942,393 | 3/1976 | Forster et al. | 74/862 |
| 4,046,032 | 9/1977 | Braun et al. | 74/336 R X |
| 4,073,204 | 2/1978 | Dick | 74/866 |
| 4,172,505 | 10/1979 | Rabus et al. | 74/862 X |
| 4,208,929 | 6/1980 | Heino et al. | 74/866 |
| 4,224,842 | 9/1980 | Rabus et al. | 74/866 |
| 4,244,225 | 1/1981 | Greenwood | 73/517 AV |
| 4,285,252 | 8/1981 | Yamaki et al. | 74/862 X |
| 4,442,727 | 4/1984 | Young | 74/336 R |
| 4,474,082 | 10/1984 | Spokas et al. | 192/3.58 X |
| 4,495,837 | 1/1985 | Morscheck | 74/336 R X |
| 4,517,859 | 5/1985 | Nagaoka et al. | 74/336 R X |
| 4,542,460 | 9/1985 | Weber | 74/866 X |
| 4,567,969 | 2/1986 | Makita | 74/335 X |
| 4,589,532 | 5/1986 | Ito et al. | 192/3.62 X |

Primary Examiner—Leslie Braun
Assistant Examiner—Dwight G. Diehl
Attorney, Agent, or Firm—Dressler, Goldsmith, Shore, Sutker & Milnamow, Ltd.

[57] ABSTRACT

A shift control system for a material handling implement including a transmission having a plurality of selectively electrically-operated hydraulic clutches is disclosed. The system includes a manually positionable gear selector which provides electrical signals respectively corresponding to actuation of the transmission's hydraulic clutches. Notably, the system includes acceleration sensing means arranged to sense acceleration of the implement along its longitudinal axis, with the acceleration sensing means operatively connected with the electrical controls which interface the gear selector and the electro-hydraulic valves which operate the hydraulic clutches. By this system, acceleration on the implement, either negative or positive, created during upshifting of the transmission is monitored, and the sequential operation of the hydraulic clutches for the next-requested shift automatically adjusted responsively to the sensed acceleration for facilitating smooth shifting of the transmission.

7 Claims, 4 Drawing Figures

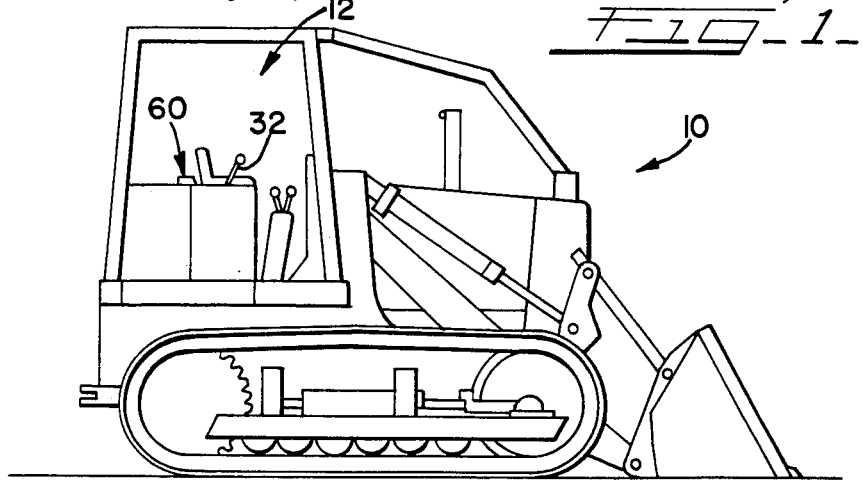
FIG-1
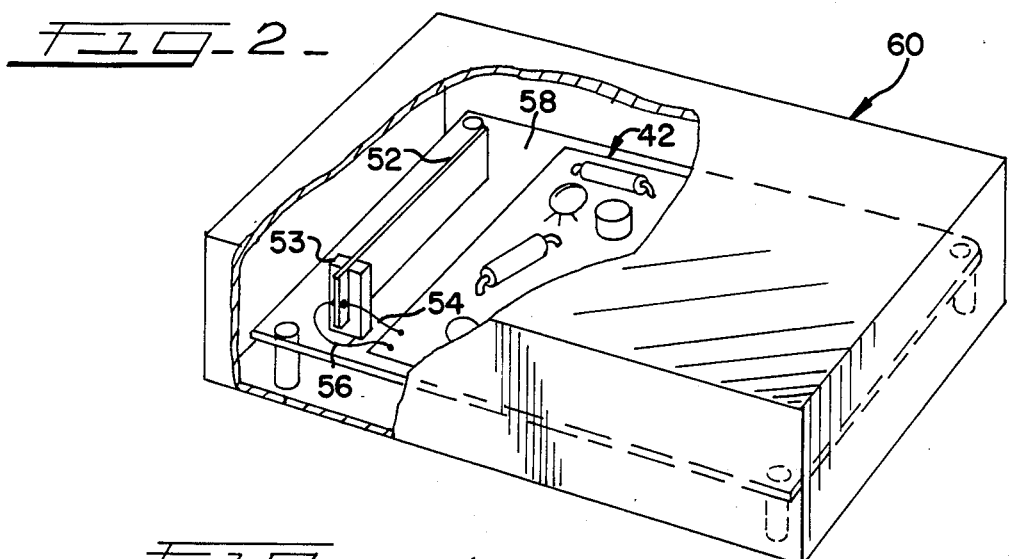
FIG-2
FIG-4
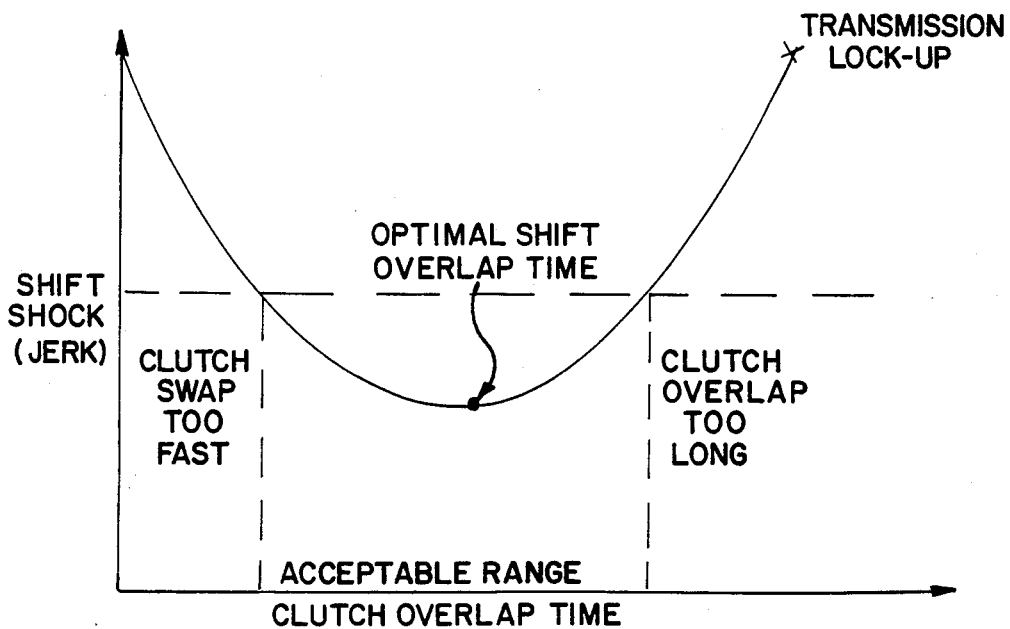

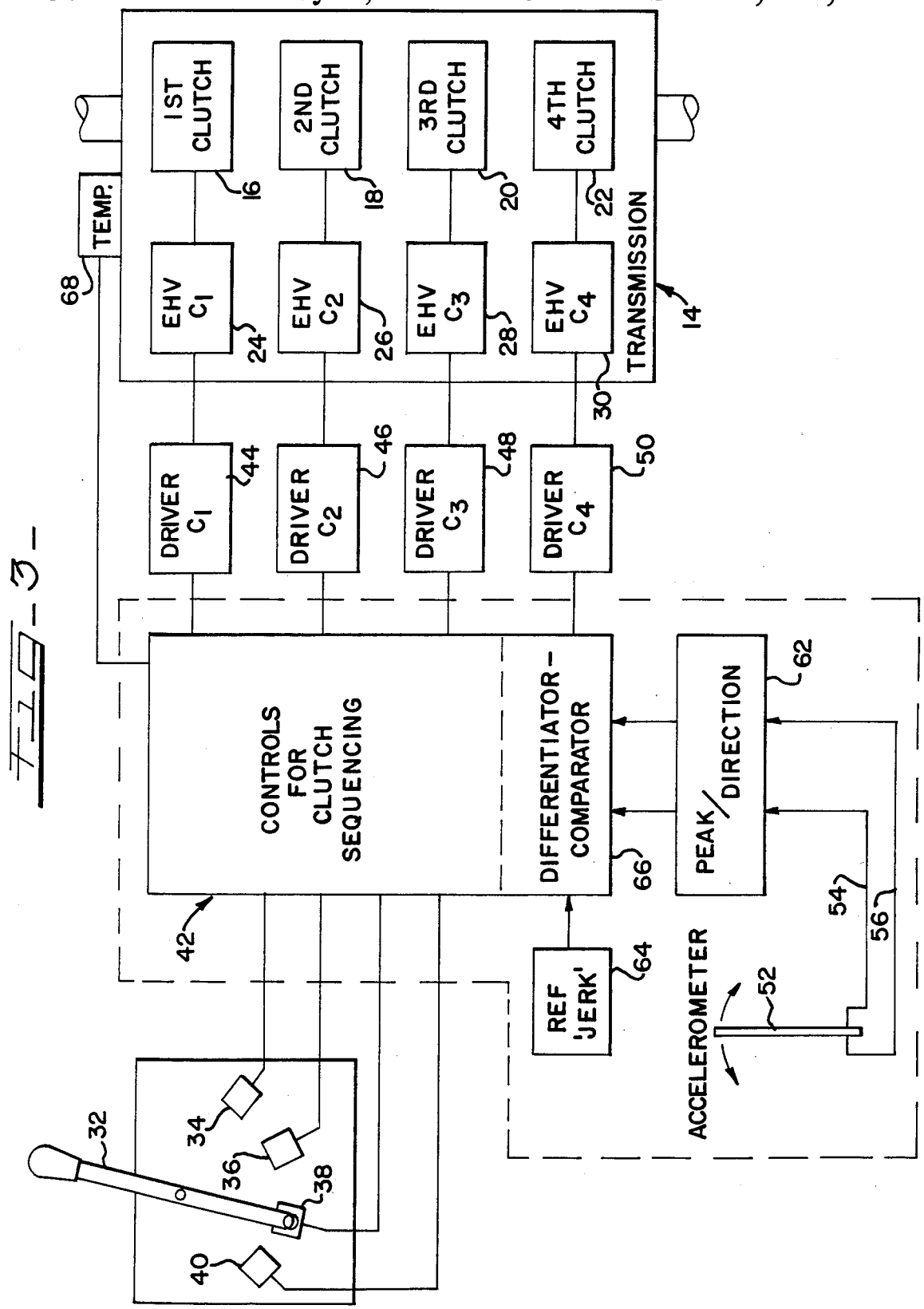

SHIFT CONTROL SYSTEM FOR IMPLEMENT TRANSMISSION

TECHNICAL FIELD

The present invention relates generally to a control arrangement for an implement transmission having a plurality of electrically-operated hydraulic clutches, and more particularly to a shift control system which adjusts the sequential engagement and disengagement of the hydraulic clutches by monitoring accelerations of the implement attendant to transmisson shifting, thus facilitating smoother shifting.

BACKGROUND OF THE INVENTION

Material handling implements such as tractors, bulldozers, and the like, frequently employ multi-speed transmissions which are configured to effect gear ratio selection by selective fluid pressurization of hydraulic clutches. In such a transmission, a plurality of such hydraulic clutches are typically provided, wherein engagement of each clutch by fluid pressurization provides a respective one of the transmission's multiple speeds. Electrically-operated hydraulic valves are typically employed for supplying pressurized fluid to the hydraulic clutches.

Desirably, transmissions of this type are usually arranged to obviate the need for the implement operator to manually engage and disengage a clutch mechanism attendant to transmission shifting, but rather permit the operator to effect selection of the desired transmission speed merely by manipulation of a suitable gear selection control. This control operates through suitable circuitry to operate the electro-hydraulic valves and effect shifting by sequentially pressurizing one of the transmission's hydraulic clutches (for engagement) while relieving fluid pressure in the previously engaged hydraulic clutch. Naturally, efficient operation of the implement is promoted by convenient transmission gear ratio selection.

As will be appreciated by those familiar with the art, it is desirable that a transmission such as described be operated such that shifting of gear ratios is effected as smoothly as possible. This requires relatively precise sequential operation of the transmission's hydraulic clutches. Although fluid pressurization and depressurization of the clutches for shifting is effected quite quickly, operation of the associated electro-hydraulic valves and full clutch engagement or disengagement require distinct and finite time periods.

Accordingly, control arrangements for such transmissions typically function such that fluid pressurization of the hydraulic clutch for a newly-selected speed is commenced prior to relief of fluid pressure in the hydraulic clutch which is in engagement prior to shifting. Operation of the transmission's clutches in this manner is sometimes referred to as "clutch swap", with the time period between initiation of engagement of one of the clutches and disengagement of another of the clutches sometimes referred to as "clutch overlap".

Minimization of "shift shock" or "jerk" is the desired goal in configuring transmission control systems. Shift shock is a function of the time rate of change of acceleration of the implement. As will be recognized, timing of the sequential operation of the hydraulic clutches is directly related to shift shock. If the clutch overlap sequencing time is too short, i.e., the one clutch is disengaged too quickly after initiation of pressurization of the next clutch, both the on-coming and off-going clutches can be momentarily disengaged. When under load, the implement will quickly decelerate; when the on-coming clutch is pressurized and engages, the implement accelerates with a significant shift shock. If the clutch overlap sequencing time is too long, i.e., disengagement of one clutch is not effected quickly enough after pressurization of another clutch is initiated, the implement can jerk forward when shifted, or a momentary clutch "lock-up" in the transmission can occur, again causing a large shift shock.

In the past, control arrangements for such transmissions have been arranged to monitor fluid pressures in the various hydraulic clutches, with clutch sequencing effected in accordance with the changing fluid pressures. While such arrangements can perform satisfactorily, these systems of course do not monitor the actual smoothness of a shift, but instead must be arranged to provide shifting which is a smooth as possible under widely varying conditions. Shift performance can be affected depending upon the operating environment, hydraulic fluid temperatures, and the like.

It is therefore desirable to provide a control arrangement for a transmission having a plurality of selectively operable hydraulic clutches wherein shift performance is monitored, and the sequential operation of the hydraulic clutches thereafter automatically adjusted for optimizing smooth and shock-free shifting.

SUMMARY OF THE INVENTION

The shift control system of the present invention is particularly suited for use with a material handling implement including a transmission having a plurality of selectively electrically-operated hydraulic clutches. Significantly, the control system includes an acceleration sensing device operatively connected with the electrical controls of the system which effect operation of the hydraulic clutches. By this arrangement, excessive shock or jerk during shifting is sensed, and the sequential timing for the next shift responsively adjusted for abating jerk on the next-effected shift.

The present control system includes a manually positionable gear selection control mechanism for selectively providing a plurality of gear selection electrical signals which respectively correspond to actuation and engagement of one of the electrically-operated hydraulic clutches of the transmission. The gear selection mechanism may comprise a suitable lever or the like provided in the operator's control area of the implement, and further includes a plurality of suitable electrical switching devices which are selectively operated for providing the gear selection signals.

The present system further includes acceleration sensing means arranged to sense acceleration of the implement along its longitudinal axis, and to provide an acceleration electrical signal corresponding to the sensed acceleration. While such acceleration sensing devices, i.e., accelerometers, are known, the present system preferably imploys a very economical and reliable piezoelectric ceramic element mounted in a cantilevered manner for sensing acceleration and for providing an electrical voltage signal reflective thereof. Use of a piezoelectric element in this manner is particularly preferred in view of the relatively small size of a suitably configured element, the attendant versatility in its mounting, and the generation of electrical signals of opposite polarity attendant to positive and negative accelerations on the implement.

The present control system further includes electrical control means, preferably comprising a suitably programmed microprocessor, which is operatively connected with the gear selection mechanism, the acceleration sensing means, and the electrically-operated hydraulic clutches of the implement transmission. The electrical controls are arranged to effect the desired sequential operation of the hydraulic clutches in response to operator manipulation of the gear selection mechanism. Thus, the electrical controls receive the gear selection signals from the gear selection mechanism, and thereafter provide output signals to the electrically-operated clutches for effecting transmission shifting by sequentially disengaging a first one of the hydraulic clutches in timed relation with engagement of a second one of the clutches. As noted, fluid pressurization of the second, on-coming clutch is initiated prior to relief of fluid pressure in the first, off-going clutch.

The electrical controls are configured to receive the acceleration signal from the acceleration sensing means attendant to shifting of the transmission. In this manner, the electrical controls operate to automatically adjust the timing for the next effected shift, i.e., to adjust the timing between the disengagement of the second hydraulic clutch and engagement of another one of the clutches. Smooth shifting of the implement's transmission is thus facilited since sequential clutch operation is automatically adjusted based upon the previous shift.

As noted, the preferred piezoelectric acceleration sensing device desirably provides a negative electrical signal attendant to sensed acceleration in one direction along the implement's longitudinal axis, and a positive electrical signal attendant to sensed acceleration in an opposite direction along the axis. The electrical controls preferably include suitable circuitry for establishing the polarity and initial peak in sensed acceleration during shifting, and for differentiating the sensed acceleration with respect to time for providing a jerk acceleration signal.

The electrical controls further preferably include means for generating a reference jerk electrical signal for comparison with the sensed jerk acceleration signal, whereby the timing between disengagement and engagement of different ones of the hydraulic clutches is adjusted only when the jerk acceleration signal exceeds a predetermined value corresponding to the reference signal.

Thus, when sensed jerk accelerations during shifting are within an acceptable range, no adjustment in shift timing is made. However, when the jerk acceleration signal exceeds the predetermined value of the reference signal, and a positive acceleration is sensed, the time period between sequential engagement of one clutch and disengagement of another clutch is increased (i.e., clutch overlap is decreased). Conversely, when a negative initial acceleration is sensed, clutch overlap is increased by shortening the time period between engagement of one hydraulic clutch and disengagement of another. Adjustment of the sequential operation of the clutches in this manner is effected during upshifting of the transmission.

As noted, the use of a piezoelectric ceramic element for the acceleration sensing device of the present system is desired for the low cost, simplicity, and compact size of such a device. This compact size permits the element to be mounted in close association with the electrical controls, preferably by mounting within a common housing enclosing both. Not only is such an arrangement desirably compact in its overall dimensions, the preferred common mounting in the housing further reduces costs by eliminating the need for additional enclosures, interconnecting cables, connectors, and the like.

Further features and advantages of the present invention will become readily apparent from the following detailed description, the accompanying drawings, and the appended claims.

BRIEF DESCRIPTION OF THE DRAWINGS

FIG. 1 is a side elevational view of a material handling implement with which the present shift control system is suited for use;

FIG. 2 is a perspective view in partial cut-away illustrating an acceleration sensing device of the present control system, and its mounting in association with electrical controls of the system;

FIG. 3 is a diagrammatic view illustrating the present shift control system and its operative connection with a transmission of the material handling implement such as shown in FIG. 1; and FIG. 4 is a diagram illustrating the relationship between variations in the sequential operation of the hydraulic clutches of the transmission shown in FIG. 3 and the shift shock or jerk generated attendant to transmission shifting.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 1, therein is illustrated a material handling implement 10, illustrated as comprising a crawler-tracked bulldozer, which is intended as illustrative of the type of implement for which the present shift control system is suited. Implement 10 includes an operator's cab 12 wherein various control levers and the like are provided for operation of the implement. One of the components of implement 10 operated from the cab area is its multi-speed transmission, a diagrammatic form of which is illustrated in FIG. 3, and is designated 14. Transmission 14 is likewise intended as illustrative of the type of transmission for which the present control system is particularly suited.

The specific details of the construction and operation of transmission 14 will be well known by those familiar with the art, and in and of themselves form no part of the present invention. However, a basic understanding of the transmission's operation will make clear the manner in which the present control system effects transmission shifting.

A mutli-speed transmission such as 14 typically includes a plurality of hydraulic clutches, each of which is operatively associated with a respective one of the speeds or gear ratios of the transmission. Thus, transmission 14 is illustrated as including a first speed clutch 16, a second speed clutch 18, a third speed clutch 20, and a fourth speed clutch 22. Engagement of each clutch, and thus selection of its associated gear ratio, is effected by hydraulic fluid pressurization of the clutch. In the context of an electrically-operated transmission as shown, such selective fluid pressurization of the hydraulic clutches is effected by way of solenoid or servo-operated electro-hydraulic valves. Accordingly, each of the clutches of the transmission has operatively associated therewith a respective electro-hydraulic valve (EHV), designated 24, 26, 28, and 30 in the drawings.

Shifting of transmission 14 is effected electrically in the sense that selected ones of the electro-hydraulic valve sare operated attendant to each shift. While operation of the valves and attendant pressurization or depressurization of the hydraulic clutches is effected quite quickly, a finite and distinct time period is required for providing electrical power to a valve for its operation, operation of the valve, and the complete and effective engagement or disengagement of its associated clutch by fluid pressurization or relief of fluid pressure.

In view of this, shifting is typically effected with "clutch overlap". When the implement operator signals a gear change, fluid pressurization of the clutch associated with the selected gear ratio is initiated. Thereafter, another of the electro-hydraulic valves is operated for initiating relief of fluid pressure in the previously engaged hydraulic clutch. Thus, clutch overlap refers to the time period during which one clutch is being pressurized while another clutch is being depressurized.

As illustrated in FIG. 4, the smoothness with which shifting of transmission 14 is effected is directly related to the clutch overlap time. The horizontal "X" axis in the graph of FIG. 4 reflects increasing clutch overlap times, while the vertical "Y" axis reflects an increase in perceived shift shock or jerk. Although some shift shock is inevitable attendant to shifting, a distinct range of clutch overlap times exists for which shift shock is at or below a maximum acceptable level. When clutch overlap time is too short (i.e., "clutch swap" is effected too quickly), shift jerk increases substantially as both the on-coming and off-going clutches are temporarily both disengaged and the implement, particularly if under load, decelerates, and then jerks forward as the on-coming clutch finally engages. In contrast, excessive clutch overlap can result in excessive shift shock as the implement tends to jerk forward, with excessive overlap eventually resulting in transmission lock-up, which can stall the associated implement engine.

With the above principles in mind, the shift control system of the present invention will now be described. The present control system first includes suitable manually positionable gear selection means, such as comprising gear selection lever 32 positioned in the operator's cab 12 of implement 10. Selective positioning of the gear selection lever 32 or a like control effects operation of suitable electrical switch devices whereby a plurality of electrical gear selection signals are provided respectively corresponding to actuation and engagement of the hydraulic clutches of transmission 14. Accordingly, first gear selection switch 34, second gear selection switch 36, third gear selection switch 38, and fourth gear selection switch 40 are illustrated, respectively corresponding to actuation of first clutch 16, second clutch 18, third clutch 20, and fourth clutch 22.

In accordance with the present invention, the gear selection switches are operatively connected with suitably programmed electrical controls 42, which preferably comprise microprocessor circuitry. Microprocessor circuitry is preferred for its compact size, reliability, versatile programmability, and ready availability at reasonable costs.

Controls 42 are programmed to provide the sequential operation of the hydraulic clutches of transmission 14 for effecting transmission shifting responsively to the gear selection signals received from the gear selection switches 34, 36, 38, and 40. To this end, the controls 42 are operatively connected with a plurality of electrical drivers 44, 46, 48, and 50, which receive relatively low voltage signals from controls 42, and provide the necessary electrical current for operation of the respective electro-hydraulic valves 24, 26, 28, and 30.

Attendant to upshifting of the transmission, such as by manipulation of lever 32 to deactivate first gear selection switch 34 and activate second gear selection switch 36, controls 42 function to signal driver 46 for operation of electro-hydraulic valve 26, to thereby initiate pressurization of second clutch 18, and shortly thereafter signal first driver 44 for operation of electro-hydraulic valve 24 to depressurize first hydraulic clutch 16.

Adjustment of sequential hydraulic clutch operation by controls 42 is effected by the present system by monitoring the shift shock or jerk attendant to the previously effected upshift. This is achieved by use of an acceleration sensing device arranged to sense accelerations along the longitudinal axis of implement 10. While a number of different acceleration sensing devices are known and are commercially available, it is presently preferred that the present system employ a piezoelectric ceramic element for sensing accelerations along the longitudinal axis of implement 10, and for providing an electrical acceleration signal corresponding to the sensed acceleration.

Accordingly, piezoelectric ceramic element 52 is provided on implement 10, and is preferably arranged perpendicularly to (either vertically to horizontally) the longitudinal axis of implement 10, and is mounted in cantilevered fashion at 53 whereby the opposite free end of the element 52 is movable generally along the longitudinal axis of implement 10. A pair of electrical leads 54 and 56 are respectively connected with the opposite expansive surfaces of the piezoelectric element 52, with the leads in turn operatively connected with controls 42. In a current embodiment, a generally rectangular piezoelectric element 52 has been employed, wherein the element is approximately 2 inches in length and 0.5 inches in width. A piezoelectric ceramic element of this nature is commercially available from Piezo Electric Products, Inc., Metuchen, N.J.

As will be appreciated, the relatively small size of piezoelectric element 52 greatly facilitates convenient mounting on implement 10. In this regard, it is presently preferred that the piezoelectric element be mounted in close operative association with electrical controls 42, such as by mountin9 on a common circuit board 58 or like support, as shown in FIG. 2, with both the element 52 and the electrical controls thereby positioned within a common housing 60. This arrangement obviates the need for separate enclosures for the various components, and also avoids the need for shielded wiring or the like for operatively connecting the components. If desired, the housing 60 can be positioned in the operator's cab 12, as shown in FIG. 1, thus positioning the acceleration sensing piezoelectric element 52 in close association with the implement operator.

The use of piezoelectric ceramic element 52 for sensing acceleration is further preferred in that a positive electrical voltage is created attendant to acceleration in one direction along the longitudinal axis of the implement, with a negative electrical voltage generated attendant to acceleration in an opposite direction along the longitudinal axis. Thus, this acceleration sensing arrangement provides readily distinguishable signals (i.e., opposite in polarity) attendant to positive and negative accelerations.

Referring to FIG. 3, leads 54 and 56 from piezoelectric element 52 are operatively connected with electrical controls 42 via suitable electrical means 62 which receive the acceleration signals from element 52, and provide a signal reflective of the peak or maximum acceleration sensed attendant to a transmission shift, as well as the direction of the acceleration along the longitudinal axis of the implement (i.e., negative acceleration or positive acceleration).

Since it is desired that operation of the transmission's hydraulic clutches only be adjusted when the sensed acceleration exceeds a predetermined value, suitable means 64 are preferably provided for generating a reference "jerk" electrical signal corresponding to the maximum jerk or acceleration which is permissible while still effecting acceptably smooth shifts.

The electrical controls of the present system preferably include suitable differentiator/comparator circuit means 66 for differentiating the sensed acceleration signal with respect to time to thereby provide a jerk acceleration signal, and for comparing the reference 3erk signal and the jerk acceleration signal for automatically adjusting the sequential operation of the hydraulic clutches of the transmission attendant to the next-requested transmission shift. Thus, adjustment of the clutch operation is only effected when the jerk acceleration signal generated attendant to a previous shift exceeds a predetermined value as reflected by the reference signal provided by generating means 64.

Referring again to FIG. 4, it will be appreciated that the reference jerk signal corresponds in value to the horizontal dashed line shown in the graph of FIG. 4. By way of example, an acceptably smooth shift may generate approximately 0.7 g-force, attendant to either deceleration or acceleration. Generation of approximately 0.5 g-force would reflect a very smooth shift, and would correspond to an optimal clutch overlap time during operation of hydraulic clutches 16, 18, 20, and 22. As indicated by the curve shown in FIG. 4, decreasing the clutch overlap time, or increasing the clutch overlap time, beyond certain limits, results in the generation of shift shock beyond acceptable levels. Thus, the present control system functions to adjust the electrical controls 42 whenever the sensed jerk acceleration on the implement (i.e., the shift shock) is beyond the value reflected by the reference signal from generating means 64.

It will be noted that means 62 connected with the acceleration sensing element 52 is arranged to provide an output reflective of the peak initial acceleration or deceleration sensed attendant to a transmission shift. In this manner, the electrical controls 42 can be adjusted to increase or decrease the clutch overlap time to reduce shift shock on the next-requested shift. This aspect of the system relates to the manner in which shift shock is generated. If the clutch overlap time is too long, a positive acceleration is exerted on implement 10 as an upshift of the transmission is effected, signifying that hydraulic fluid pressure in the clutch being dropped-out is not being effected quickly enough. Conversely, a negative acceleration is initially exerted on implement 10 when the clutch overlap time is too small, since there is a momentary reduction in the driving force to the implement's crawler tracks or wheels when the hydraulic clutch for the selected gear ratio is not yet fully pressurized, but pressure is releived in the clutch being dropped-out and it disengages.

Thus, adjustment of the sequential operation of the hydraulic clutches is effected responsively to the sensed acceleration, and in a manner which acts to bring the shift shock (i.e., the sensed jerk acceleration) on the next upshift to a level at or below the acceptable level as reflected by the reference signal. The exact manner in which electrical controls 42 are adjusted to achieve this end can be varied in keeping with the principals disclosed herein. For example, a step-wise increase or decrease in clutch overlap time can be effected attendant to sensed jerk acceleration exceeding the reference signal, regardless of the magnitude by which the sensed jerk acceleration exceeds the reference value. Alternately, adjustment of the sequencing time can be effected proportionately to the magnitude with which the sensed jerk acceleration exceeds the reference signal value. As will be appreciated by those familiar with the art, changes in the clutch overlap time of only a few milliseconds can alter the shift performance characteristics of the implement transmission. Thus, the electrical controls 42 can be initially pre-set for providing a clutch overlap time in accordance with pre-established values for minimizing shift shock, with the clutch overlap time thus adjusted, as may be necessary, to optimize shift performance by minimizing shift shock or jerk.

Of course, one important variable which can substantially affect the sequential operation of the transmission's hydraulic clutches is the temperature of the hydraulic fluid employed for pressurizing the clutches for selection of the associated gear ratios. Generally speaking, clutch overlap time should decrease attendant to an increase in the temperature (and thus a decrease in viscosity) of the hydraulic fluid within the implement transmission. Thus, the present system can further include a temperature sensor 68 operatively connected with electrical controls 42 for monitoring the temperature of hydraulic fluid in the transmission 14, and thereby decrease clutch overlap time responsively to an increase in the temperature of the transmission hydraulic fluid. While it will be appreciated that the present system ordinarily optimizes shift performance by sensing accelerations exerted on implement 10 attendant to shifting, the provision of such a temperature feedback control arrangement further facilitates shift performance, and acts to minimize the magnitude and frequency of adjustments to the clutch overlap timing effected attendant to acceleration-sensing.

It is presently contemplated that the present shift control system be arranged to adjust sequential hydraulic clutch operation during upshifting of implement transmission 14. Thus, the controls 42 function such that attendant to shifting of the transmission by disengaging a first one of the hydraulic clutches and engaging a second one of the hydraulic clutches, the controls 42 receive the acceleration signal provided by piezoelectric element 52, and thereby adjust the timing between disengagement of the second clutch and engagement of a third one of the clutches responsively to the sensed acceleration. Adjustment of the timing of the clutch operation during upshifting is readily effected since positive and negative accelerations are created attendant to too much clutch overlap, and too little clutch overlap, respectively. Since accelerations exerted upon implement 10 attendant to downshifting of transmission 14 will differ in direction and relation to clutch overlap time when compared to upshifting, use of the present control system for controlling upshifts only is presently contemplated, with downshifting effected in accordance with pre-established sequential timing for the hydraulic clutches. However, it will be appreciated that suitable programming of electrical controls 42 could permit sensed accelerations attendant to downshifting to be employed for adjusting clutch overlap time during this mode of operation.

From the foregoing, it will be observed that numerous modifications and variations can be effected by those skilled in the art without departing from the true spirit and scope of the novel concept of the present invention. It will be understood that no limitation with respect to the specific embodiment illustrated herein is intended or should be inferred. It is, of course, intended to cover by the appended claims all such modifications as fall within the scope of the claims.

What is claimed is:

1. A shift control system for a material handling implement including a transmission having a plurality of selectively electrically-operated hydraulic clutches, said system comprising:

manually positionable gear selection means for selectively providing a plurality of electrical gear selection siganls each respectively corresponding to actuation of one of said electrically-operated clutches;

acceleration sensing means arranged to sense acceleration of said implement along the longitudinal axis thereof by monitoring positive and negative g-forces to which said acceleration sensing means and said implement are subjected, said acceleration sensing means being arranged to provide acceleration electrical signals of opposite polarity respectively corresponding to the sensed accelerations of opposite directions along said implement axis; and electrical control means operatively connected with said gear selection means, said acceleration sensing means, and said electrically-operated clutches, said control means being configured to receive said gear selection signals and thereafter provide output signals to said electrically-operated clutches for effecting shifting of said transmission by sequentially disengaging a first one of said clutches, subsequent to engaging a second one of said clutches, said control means being further configured to receive said acceleration signal from said acceleration sensing means attendant to said shifting of said transmission and thereby adjust the timing between disengagement of said second clutch and engagement of a third one of said clutches for facilitating smooth shifting of said transmission.

2. A shift control system in accordance with claim 1, wherein
   said control means includes means for generating a reference electrical signal for comparison with said acceleration signal whereby said timing between disengagement and engagement of different ones of said electrically-operated clutches is adjusted only when said acceleration signal exceeds a predetermined value corresponding to said reference signal.

3. A shift control system in accordance with claim 2, wherein
   said acceleration sensing means comprises a piezoelectric element which creates an electrical potential when subjected to acceleration forces and which provides a negative electrical voltage signal attendant to sensed acceleration in one direction along said implement longitudinal axis, and a positive electrical voltage signal attendant to sensed acceleration in an opposite direction along said sensed acceleration in an opposite direction along said implement longitudinal axis.

4. A shift control system in accordance with claim 3, including
   common housing means for together enclosing said electrical control means and said piezoelectric ceramic element.

5. A shift control system in accordance with claim 1, including
   means for sensing the temperature of hydraulic fluid in said transmission for said electrically-operated hydraulic clutches, said temperature sensing means being operatively connected to said control means whereby said control means adjusts the timing between engagement and disengagement of different ones of said clutches responsively to changes in the temperature of the hydraulic fluid.

6. A shift control system for a material handling implement including a transmission having a plurality of selectively actuated hydraulic clutches operated by respective electro-hydraulic valve means, said system comprising:

manually positionable gear selection means for selectively providing a plurality of electrical gear selection signals each respectively corresponding to actuation of one of said hydraulic clutches via its respective electro-hydraulic valve means;

acceleration sensing means comprising cantilevered piezoelectric means arranged to sense acceleration of said implement along the longitudinal axis thereof and to create an electrical potential when subjected to acceleration forces, said piezoelectric means providing a positive polarity acceleration signal attendant to sensed acceleration in one direction along said implement longitudinal axis, and a negative polarity acceleration signal attendant to sensed acceleration in an opposite direction along said implement longitudinal axis;

means for generating a reference signal for comparison with said acceleration signal; and electrical control means operatively connected with said gear selection means, said acceleration sensing means, said reference signal generating means, and said electro-hydraulic valve means for said plurality of hydraulic clutches, said control means being configured to receive said gear selection signals and thereafter provide output signals to said electro-hydraulic valve means for effecting upshifting of said transmission by sequentially disengaging a first one of said clutches subsequent to engaging a second one of said clutches, said control means being further configured to receive said acceleration signals from said acceleration sensing means attendant to said upshifting of said transmission by said operation of said first and second hydraulic clutches, to compare said acceleration signals with said reference signal, and to adjust the timing between sequential disengagement of said second clutch and engagement of a third one of said clutches attendant to further upshifting of said transmission when said acceleration signals exceed a predetermined value corresponding to said reference signal, to thereby facilitate smooth shifting of said transmission.

7. A shift control system in accordance with claim 6, including means for sensing the temperature of hydraulic fluid in said transmission for said hydraulic clutches, said temperature sensing means being operatively connected to said control means whereby said control means adjusts the sequential timing between engagement and disengagement of different ones of said clutches responsively to changes in the temperature of the hydraulic fluid.

* * * * *